…

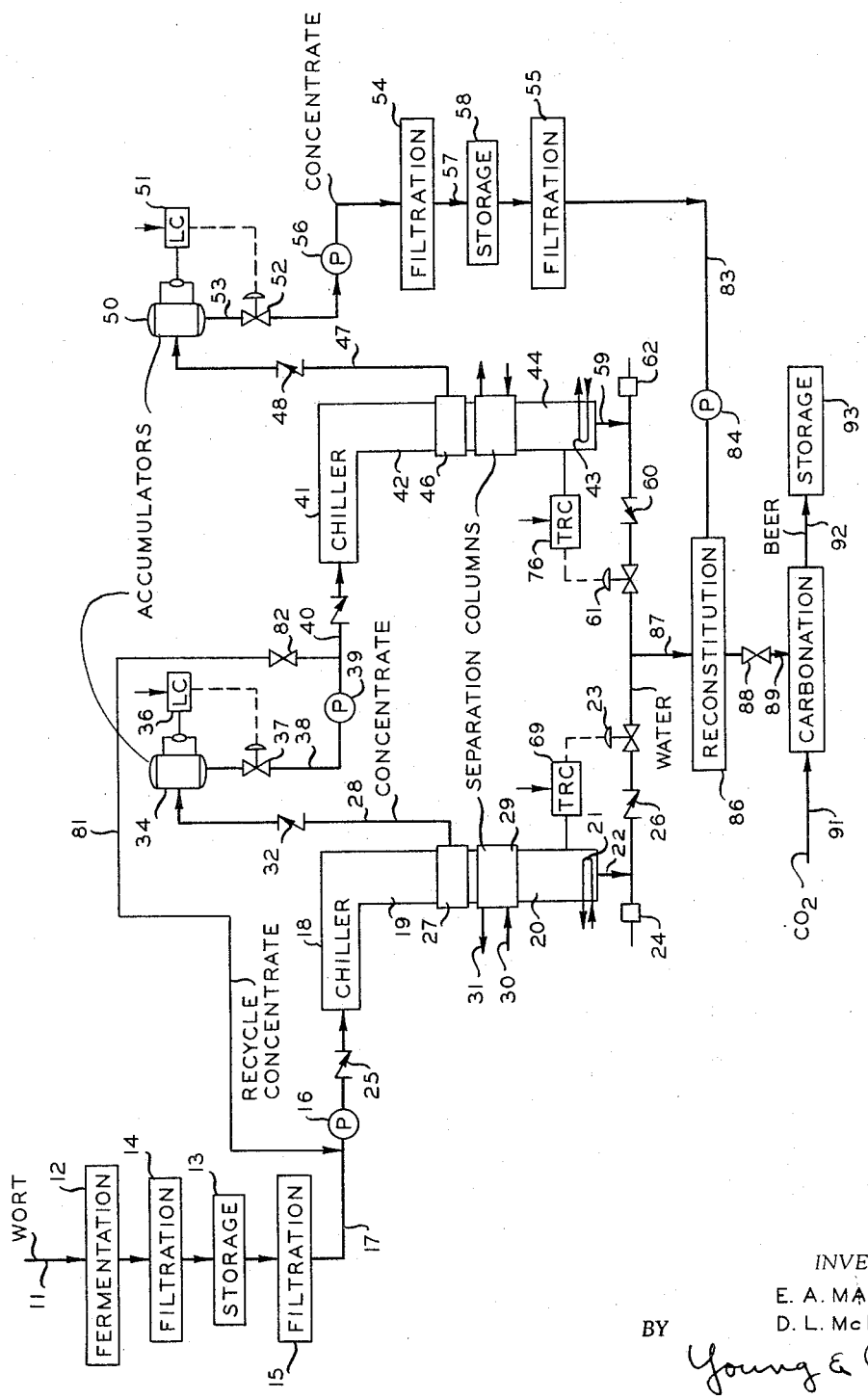

United States Patent Office 3,295,988
Patented Jan. 3, 1967

3,295,988
PREPARATION OF RECONSTITUTED BEER
Emil A. Malick and Dwight L. McKay, Bartlesville, Okla., assignors to Phillips Petroleum Company, a corporation of Delaware
Filed Nov. 21, 1963, Ser. No. 325,377
6 Claims. (Cl. 99—31)

This application is a continuation-in-part of our application Serial No. 207,581, filed July 5, 1962, and now U.S. Patent No. 3,240,025 for Concentration of Solutions by Crystallization.

This invention relates to a method of concentrating solutions by crystallization. In another aspect it relates to an improved method of using a crystal purification column for the removal of water from beer. In a further aspect it relates to an improved method of concentrating aqueous solutions, e.g., beer, and reconstituting the resulting concentrate.

The concentration of aqueous solutions such as fruit juices, wine, and beer by crystallization to remove water therefrom presents a number of advantages. Substantial savings can be realized in packaging, freight and storage of the product. Also beer which has been concentrated by crystallization, filtered and reconstituted has a longer shelf-life than beer which has not been processed in this manner. Concentrating beer by crystallization followed by filtration of the concentrate can serve as an accelerated lagering process and thus greatly reduce the requirements in breweries for large inventories and refrigerated storage tanks.

One very favorable method of concentrating such solution by crystallization makes use of crystal purification columns such as are described in the U.S. Patent Re. 23,810 to Schmidt, and the U.S. Patent No. 2,854,494 to R. W. Thomas. The use of these crystal purification columns involves the formation of a crystal slurry by cooling the product to be concentrated and then forcing the resulting slurry of crystals and mother liquor into an elongated confined separation zone. The crystals are moved in a compact mass into a body of liquid which is formed by melting the crystals in a downstream portion of the concentration zone. A portion of the crystal melt is displaced back into the advancing crystal mass to remove occluded mother liquor therefrom. The crystals enter the column at a temperature below the melting point of pure water so that they are warmed and ultimately melted as they are passed through the separation zone. When concentrating beer, it is desired that substantially pure water be withdrawn from a downstream portion of the zone while mother liquor, which is a beer concentrate, be withdrawn from a mid-section of the concentration zone substantially undiluted with crystal melt.

Accordingly, it is an object of our invention to provide an improved method of concentrating solutions by crystallization. Another object of our invention is to provide a method for concentrating beer using the crystal purification units such as disclosed by the Schmidt and Thomas patents cited above. Another object of our invention is to provide a method of purifying beer by crystallization and filtration. Another object of our invention is to provide an improved method of concentrating aqueous solutions, e.g., beer, and reconstituting the resulting concentrate.

According to one aspect of this invention, the method of concentrating and reconstituting the concentrate or mother liquor withdrawn from the crystal purification or separation column is improved by reconstituting the concentrate with the water also withdrawn from said column. Reconstitution with such water is highly desirable since this water will have the correct mineral content and also may contain trace amounts of alcohol and/or extract from the beer. According to another aspect of this invention, the method of concentrating and reconstituting the beer is improved by subjecting the beer after completion of fermentation to storage, with filtration of the beer before and/or after such storage. According to a further aspect of this invention, the method of concentrating and reconstituting the beer is improved by subjecting the concentrate or mother liquor produced by the crystal purification or separation step to storage, with filtration of the concentrate before and/or after such storage. In a still further embodiment of this invention, the method of concentrating and reconstituting the beer is improved by a combination of any one or all of said aspects.

The objects and advantages of this invention will now be described with reference to the accompanying drawing, in which the single figure schematically illustrates in the form of a flowsheet the process of concentrating and reconstituting beer together with the various aspects of this invention.

As illustrated in the drawing, wort 11 is passed to fermentation step 12, which is the final step of the brewing process. Yeast is added and during the course of the fermentation carbon dioxide is evolved and it can be passed to suitable carbon dioxide storage from which it may be withdrawn for purposes of carbonating the reconstituted beer and/or other purposes. After completion of fermentation, the beer can be passed to storage 13. According to one aspect of this invention, such storage can be employed for purposes of clarification of the fermented beer and improvement in its aroma and taste. The duration of such storage can vary; it can be, for example, from a day to a week or, as in the case of conventional lagering, it can be two to five weeks and have the characteristics of ruh beer. If desired, sediment and other insoluble materials present in the beer as it leaves the fermentation step 12 can be removed by filtration step 14. Also, if desired, any sediment or insoluble material present in the beer after it leaves storage 13 can be removed by filtration step 15. The beer to be concentrated is passed by pump 16 through line 17 into chiller 18. Here the beer is cooled so that a slurry of ice crystals is formed in the beer concentrate or mother liquor. The solids content of this slurry should be as high as possible and the limiting factor will be the thickness of the slurry. If the slurry is too stiff it cannot be readily moved into and through the separation column. Ordinarily crystal slurries having greater than 50 percent solids cannot be efficiently processed. More frequently the solids content of the slurry is in the range of about 25 to 40 percent of the total slurry on a weight basis.

This slurry of ice crystals and mother liquor is passed from chiller 18 into separation column 19. The chiller 18 and separation column 19 can be constructed as a single unit with the chiller being an upstream extension of the concentration column, as shown, or the units can be separate and connected with a conduit. In separation column 19, the ice crystals are forced in a compact mass through the column into a body of water in the downstream end 20. This water is formed by melting the ice crystals by means of heating element 21, such as a resistance coil or a steam line. Water is removed from the downstream end 20 of column 19 through conduit 22 but the rate of water removal is restricted by motor valve 23 so that water is displaced by pulse unit 24 back into the advancing crystal mass. Check valve 25 in conduit 17 prevents back flow in conduit 17 on the forward stroke of pulse unit 24. Check valve 26 prevents back flow of water through valve 23 on the back stroke of pulse unit 24. As the crystal mass is forced forward, the mother liquor is displaced from the column through filter section 27 from which it is withdrawn through conduit 28. If desired, the crystal mass in column 19 can be warmed slightly by circulating a heat exchange fluid through jacket 29 having inlet 30 and outlet 31.

The mother liquor in conduit 28 is passed through check valve 32 into accumulator 34. A vapor space, from which some carbon dioxide may be withdrawn, is maintained in accumulator by liquid level controller 36 operatively connected to motor valve 37 and liquid outlet conduit 38.

In the embodiment illustrated, employing two units in series, the mother liquor is then passed by pump 39 through conduit 40 into a second chiller 41. The crystal forming operation is repeated in chiller 41 to produce a slurry of ice crystals in mother liquor which is a still more highly concentrated beer. The resulting slurry is passed into a second separation column 42. Operating in the same manner as described in connection with column 19, the crystal melt is formed by heating elements 43 in the downstream portion 44 of column 42 and mother liquor is withdrawn through filter section 46 at a midsection of the column. Mother liquor having its ultimate desired concentration is withdrawn from column 42 through conduit 47 and passed through check valve 48 to accumulator 50. A vapor phase, from which some carbon dioxide may be withdrawn, is maintained in accumulator 50 by liquid level controller 51 operatively connected to motor valve 52 in liquid outlet conduit 53. The concentrated mother liquor is very cold at this point so that fine solids and crystallized impurities can be removed therefrom in filters 54 through which the cold concentrate is passed by pump 56.

According to another aspect of this invention, the beer concentrate is passed through line 57 to storage 58. In such storage, clarification of the concentrate and improvement in its taste and aroma can take place, and if desired, any sediment and insoluble material which may be present in the concentrate can be removed by means of filtration step 55. The duration of such storage can vary; for example, it can be from a day to a week, or for shorter or longer durations.

The water from column 42 is withdrawn through conduit 59 and passed through check valve 60 and motor valve 61. Pulse unit 62 operates in the same manner as described for unit 24. Temperature recorder controllers 69 and 76 are set to maintain desired crystal melt temperatures in columns 19 and 42, respectively, by manipulating valves 23 and 61, respectively.

As an alternative to using two or more sets of chillers and separation columns in series, mother liquor withdrawn from a column can be recycled to the chiller feeding this column. As shown in the drawing, mother liquor in conduit 38 from accumulator 34 can be passed through conduit 81 by opening valve 82, thereby feeding mother liquor to pump 16. This method of operating has the advantage in that the feed to chiller 18 is richer in beer components of alcohol and sugar so that lower temperatures can be obtained in the chiller, providing a greater temperature differential in the separation column. With this greater temperature differential more refreezing of the crystal melt is obtained and the column can be operated more efficiently. A portion of the concentrate from conduit 53 can be recycled to chiller 41. Using a plurality of chiller and concentration column units it can be readily seen that a number of different combinations of series and parallel flow relationships with recycle of concentrate can be provided.

In another alternate method of operating, all of the concentrate in conduit 53 can be decarbonated by pressure reduction and all or a portion of the thus decarbonated concentrate passed to filtration unit 54. By proceeding in this manner the filters do not have to be operated under pressure. Decarbonation can also be effected on the filtered concentrate in conduit 57 so that the storage vessel 58 need not be held under superatmospheric pressure. Partial decarbonation of the concentrate is relatively simple since all that is required is a reduction of gauge pressure. It should be understood that complete decarbonation of the concentrate is undesirable and would not be accomplished without using subatmospheric pressure or heat which is undesirable at this point.

Beer concentrate from storage 58 can be packaged and shipped as concentrate. Even if this is not done, however, and reconstitution is carried out within the brewery, the steps of concentration and filtration as described are highly desirable in improving the quality of the beer and in extending its shelf-life. Immediate reconstitution can be carried out by passing the beer concentrate from storage 58 through conduit 83 by pump 84 to reconstitution or diluting step 86. Water withdrawn from column 19 through conduit 22 is joined with the water in conduit 59 from column 42 and passes through conduit 87 to diluting step 86. If the water from columns 19 and 42 is not to be used for reconstitution, it can be discharged to waste, and treated water from another source can be used for reconstitution.

Reconstitution with the purified water removed from the separation columns is highly desirable since this water has the correct mineral content and also may contain trace amounts of alcohol and/or extract from the beer. Furthermore, such water will be uniform characteristics and compatable with the concentrate since it was employed in the original brew and its use in reconstitution will not introduce new and objectionable characteristics into the reconstituted beer, such as minerals, gases, sulfur, chlorine, solids, etc. This water can be filtered, if desired, prior to the reconstitution step, depending upon the amount of solids or sediment present in the water as it is removed from the separation column.

Reconstituted beer is passed through valve 88 and conduit 89 to carbonation step 90. Here the reconstituted beer is contacted with carbon dioxide supplied via conduit 91. The finished beer, with filtration if desired, is then passed through conduit 92 to storage 93 from which it is ultimately metered and packaged. In carbonation step 90, ordinarily about 1 volume of carbon dioxide is added per volume of beer. This of course depends upon the concentration of carbon dioxide in the reconstituted beer since the finished product should contain about 2.5 to 2.8 volumes of carbon dioxide per volume of beer. If some of the concentrate has been decarbonated, more carbon dioxide must be added in the carbonation step. Reconstitution and carbonation can be carried out in a single step.

In order to illustrate our invention further the following example is presented. The conditions and proportions are typical only and should not be construed to limit our invention unduly.

Beer from a brewing fermentation step and containing 1.65 volume of carbon dioxide (STP) per volume of liquid is cooled in a first chiller to form a slurry. The beer from the fermentor contains 3.75 percent alcohol and 4.25 percent extract with the remainder water and carbon dioxide. The beer is cooled in the first chiller to 24° F., thereby forming a slurry of ice crystals in mother liquor, the slurry having a solids content of 50 percent. This slurry is passed through a first crystal separation column wherein the ice crystals are melted and the resulting melt is withdrawn as purified water. Based upon 100 pounds of beer fed to the first chiller, 50 pounds of water and 50 pounds of mother liquor are withdrawn from the first separation column. This mother liquor is passed to a second chiller where the temperature is lowered to 13.5° F. forming a slurry of 50 percent solids. This slurry is passed through a second separation column from which 25 pounds of water are removed and 25 pounds of beer concentrate are obtained. The equilibrium pressure of the carbon dioxide in the mother liquor from the first separation column is about 10 p.s.i.g. and the equilibrium pressure in the mother liquor from the second column is about 40 p.s.i.g. The feed pressure to each chiller is maintained about 75 p.s.i. above the equilibrium pressure of the carbon dioxide in the corresponding mother liquor. Thus the feed pressure to the first chiller is about 85 p.s.i.g. and about 115 p.s.i.g. to the second chiller. The indicated mother liquor outlet pressure from each column is maintained about 25 p.s.i. above the corresponding chiller feed pressure. Thus the mother liquor discharge from the first column is regulated to maintain the outlet pressure at about 110 p.s.i.g. and from the second column about 140 p.s.i.g. Thus pressures within the separation columns are at all times maintained high enough that no gaseous carbon dioxide is evolved therein.

The beer concentrate is filtered and reconstituted by adding thereto the water removed in the concentration columns so that a purified beer having its original alcohol, extract and carbon dioxide content as received from the fermentators is obtained. The reconstituted beer is carbonated by adding thereto 1 volume of carbon dioxide per volume of beer and the product is then metered and packaged for marketing.

As will be apparent to those skilled in the art various modifications can be made in our invention without departing from the spirit or scope thereof.

We claim:

1. A process for accelerating the lagering of ruh beer, said process comprising the steps of cooling the beer in a chiller to form a slurry of ice crystals in mother liquor; passing said slurry into an elongated confined separation zone wherein said ice crystals are moved in a compact mass into a body of water formed by melting said ice crystals in a downstream portion of said zone while simultaneously displacing water from said body back into the advancing crystal mass; withdrawing water from said downstream portion of said zone; withdrawing mother liquor from a midportion of said zone thereby forming a beer concentrate; and reconstituting said beer concentrate with said withdrawn water.

2. A process according to claim 1 further including the step of carbonating the resulting reconstituted beer concentrate.

3. A process according to claim 1 further including the step of passing the mother liquor concentrate to a second chiller prior to the reconstituting step.

4. A process according to claim 2 further including the step of filtering the carbonated reconstituted beer prior to bottling the reconstituted beer concentrate.

5. A process according to claim 1 further including the step of maintaining said separation zone under sufficient pressure to keep carbon dioxide from evolving from said mother liquor in said separation zone.

6. The process according to claim 5 further characterized in that said pressure is maintained up to 250 p.s.i. above the vapor pressure of carbon dioxide in said separation zone.

References Cited by the Examiner

UNITED STATES PATENTS

| | | | |
|---|---|---|---|
| 2,116,939 | 5/1938 | Zohm et al. | 99—49 |
| 2,685,783 | 8/1954 | Benscheidt et al. | 62—124 |
| 2,815,364 | 12/1957 | Green | 62—58 |
| 3,128,188 | 4/1964 | McIntire | 99—48 |
| 3,193,395 | 7/1965 | Tabler et al. | 99—199 |

A. LOUIS MONACELL, *Primary Examiner.*

D. M. STEPHENS, *Assistant Examiner.*